United States Patent [19]
Kogita et al.

[11] Patent Number: 5,497,273
[45] Date of Patent: * Mar. 5, 1996

[54] RETRACTABEL REAR UNDER VIEW MIRROR SYSTEM FOR AN AUTOMOTIVE VEHICLE

[75] Inventors: Hidekazu Kogita, Kariya; Masumi Nishikawa, Toyoake; Shoji Okada, Anjo, all of Japan

[73] Assignee: Aisin Seiki Kabushiki Kaisha, Kariya, Japan

[ * ] Notice: The portion of the term of this patent subsequent to Aug. 9, 2011, has been disclaimed.

[21] Appl. No.: 111,954

[22] Filed: Aug. 26, 1993

[30] Foreign Application Priority Data

Aug. 31, 1992 [JP] Japan .................... 4-232145

[51] Int. Cl.⁶ .................... G02B 7/182
[52] U.S. Cl. .................... 359/843; 359/841; 359/872; 359/877
[58] Field of Search .................... 359/843, 841, 359/877, 872

[56] References Cited

U.S. PATENT DOCUMENTS

| | | | |
|---|---|---|---|
| 3,468,218 | 9/1969 | Schimmelpfennig | 89/36 |
| 3,612,667 | 10/1971 | Orr | 350/289 |
| 3,820,877 | 6/1974 | Moyer | 350/289 |
| 4,469,405 | 9/1984 | Chin-Wun | 350/302 |
| 4,758,078 | 7/1988 | Bracamonte | 350/604 |
| 4,911,545 | 3/1990 | Miller | 350/604 |
| 4,936,669 | 6/1990 | Wun | 350/604 |
| 4,936,670 | 6/1990 | Yoo | 350/604 |
| 5,056,904 | 10/1991 | Okamura | 359/841 |
| 5,210,652 | 5/1993 | Perkinson | 359/841 |
| 5,337,190 | 8/1994 | Kogita et al. | 359/877 |

FOREIGN PATENT DOCUMENTS

| | | |
|---|---|---|
| 0153743 | 9/1985 | European Pat. Off. . |
| 2543083 | 9/1984 | France . |
| 2663595 | 12/1991 | France . |
| 2681821 | 4/1993 | France . |
| 808530 | 1/1952 | Germany . |
| 3718125 | 8/1988 | Germany . |
| 4011150 | 10/1991 | Germany . |
| 57-4440 | 1/1982 | Japan . |
| 58-194640 | 11/1983 | Japan . |
| 59-50834 | 3/1984 | Japan . |
| 60-179350 | 9/1985 | Japan . |
| 61-146653 | 7/1986 | Japan . |
| 61-150849 | 7/1986 | Japan . |
| 62-4441 | 1/1987 | Japan . |
| 1-127430 | 5/1989 | Japan . |
| 1-27430 | 5/1989 | Japan . |
| 0208143 | 8/1990 | Japan .................... 359/843 |
| 3-28342 | 4/1991 | Japan . |
| 4-39140 | 2/1992 | Japan . |
| 911251 | 11/1962 | United Kingdom . |

*Primary Examiner*—Georgia Y. Epps
*Assistant Examiner*—Tom Robbins
*Attorney, Agent, or Firm*—Burns, Doane, Swecker & Mathis

[57] ABSTRACT

The invention is directed to a retractable rear under view mirror system for an automotive vehicle having a rear door mounted on a vehicle body and hinged at a rear upper portion thereof. There is provided rearward of the automotive vehicle, a deflector which is mounted on the rear door at its upper portion and on which a recess is formed. A mirror assembly is movably supported by the deflector, and selectively positionable from a retracted position to an extended position. A motor is provided for actuating the mirror assembly to be positioned in the retracted position or the extended position. The motor is controlled by an controller in response to an output of a detector for detecting a state of the rear door which is positionable in its open state and its closed state. Consequently, the mirror assembly is moved to a position responsive to the state of the rear door, such that the mirror assembly is automatically retracted when the rear door is closed.

9 Claims, 12 Drawing Sheets

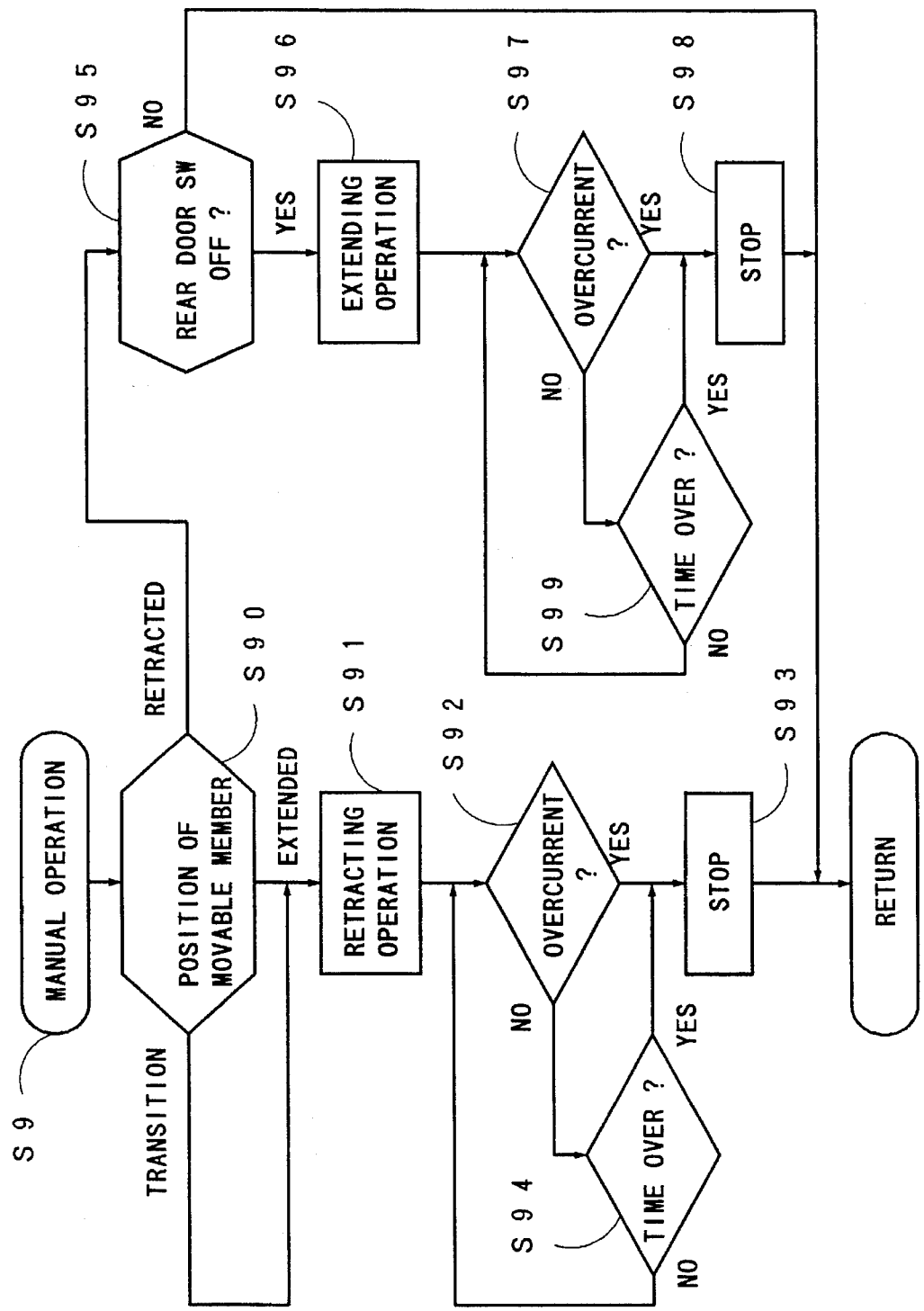

RETRACTABEL REAR UNDER VIEW MIRROR SYSTEM FOR AN AUTOMOTIVE VEHICLE

BACKGROUND OF THE INVENTION

1. Field of the Invention

The present invention relates to a retractable rear under view mirror system provided rearward of an automotive vehicle for ensuring a rear under field of view from a driver's seat of the vehicle, and more particularly to the retractable rear under view mirror system which is positionable in a stored position where a mirror assembly is stored at a rear upper portion of the vehicle, and a use position where the mirror assembly is extended.

2. Description of the Prior Art

A retractable rear under view mirror system has been proposed in a Japanese Patent Laid-open Publication No. 1-127430, for example, to improve a configuration of a van-type automotive vehicle, wherein a rear under view mirror is fixedly secured to an external surface of the vehicle to extend rearward thereof. In the mirror system disclosed in this publication, there is formed a recess at a rear end portion of the van-type vehicle which has a rear door hinged at its upper portion. A mirror assembly is retractably disposed in the recess, and actuated by a mirror actuating device to be extended out of the recess for ensuring the rear under field of view from the driver's seat. The mirror actuating device is energized by a manual switch operated by the driver of the vehicle. As an embodiment, there is provided a spoiler for reducing a lift created at a rear portion of the vehicle, or a deflector, and the recess is formed in the spoiler for receiving the mirror assembly.

However, according to the above-described rear under view mirror system, supposing that the driver operated the manual switch to actuate the mirror actuating device to thereby cause movement of extending the mirror assembly out of the spoiler, when the rear door is opened upward, the mirror assembly extended out of the spoiler is likely to collide with an obstacle over the vehicle, and as a result the mirror assembly will be damaged. Or, when the rear door is opened upward, the driver may operate the manual switch to move the mirror assembly to be extended out of the recess. In this case, if there is an obstacle or the like over the vehicle, the mirror assembly will be damaged.

SUMMARY OF THE INVENTION

Accordingly, it is an object of the present invention to provide a retractable rear under view mirror system for an automotive vehicle having a rear door mounted on a vehicle body and hinged at a rear upper portion thereof to be opened upward, which automatically positions a mirror assembly in its stored position to prevent it from colliding with any obstacle over the vehicle and to ensure a rear under field of view from a driver's seat.

In accomplishing the above and other objects, a retractable rear under view mirror system is installed in an automotive vehicle having a rear door which is mounted on a vehicle body and hinged at a rear upper portion thereof to be opened upward. The system includes a base member which is provided rearward of the automotive vehicle, a mirror assembly which is movably supported by the base member, and selectively positionable from a stored position to a use position, and an actuator for actuating the mirror assembly to be positioned in the stored position or the use position. A detector is provided for detecting a state of the rear door which is positionable in its open state and its closed state. And, a controller is provided for controlling the actuator in respect to an output of the detector to move the mirror assembly to a position responsive to the state of the rear door detected by the detector.

In the above-described retractable rear under view mirror system, the base member may be formed by a deflector which is mounted on the automotive vehicle in a spaced relationship therewith for deflecting air flow to the rear door. The deflector may be mounted on the rear door at an upper portion thereof.

BRIEF DESCRIPTION OF THE DRAWINGS

The above stated objects and following description will become readily apparent with reference to the accompanying drawings, wherein like reference numerals denote like elements, and in which:

FIG. 12 is a flow chart showing an operation which is executed when a manual operation is executed, according to the above embodiment.

DESCRIPTION OF THE PREFERRED EMBODIMENT

Figure 1:
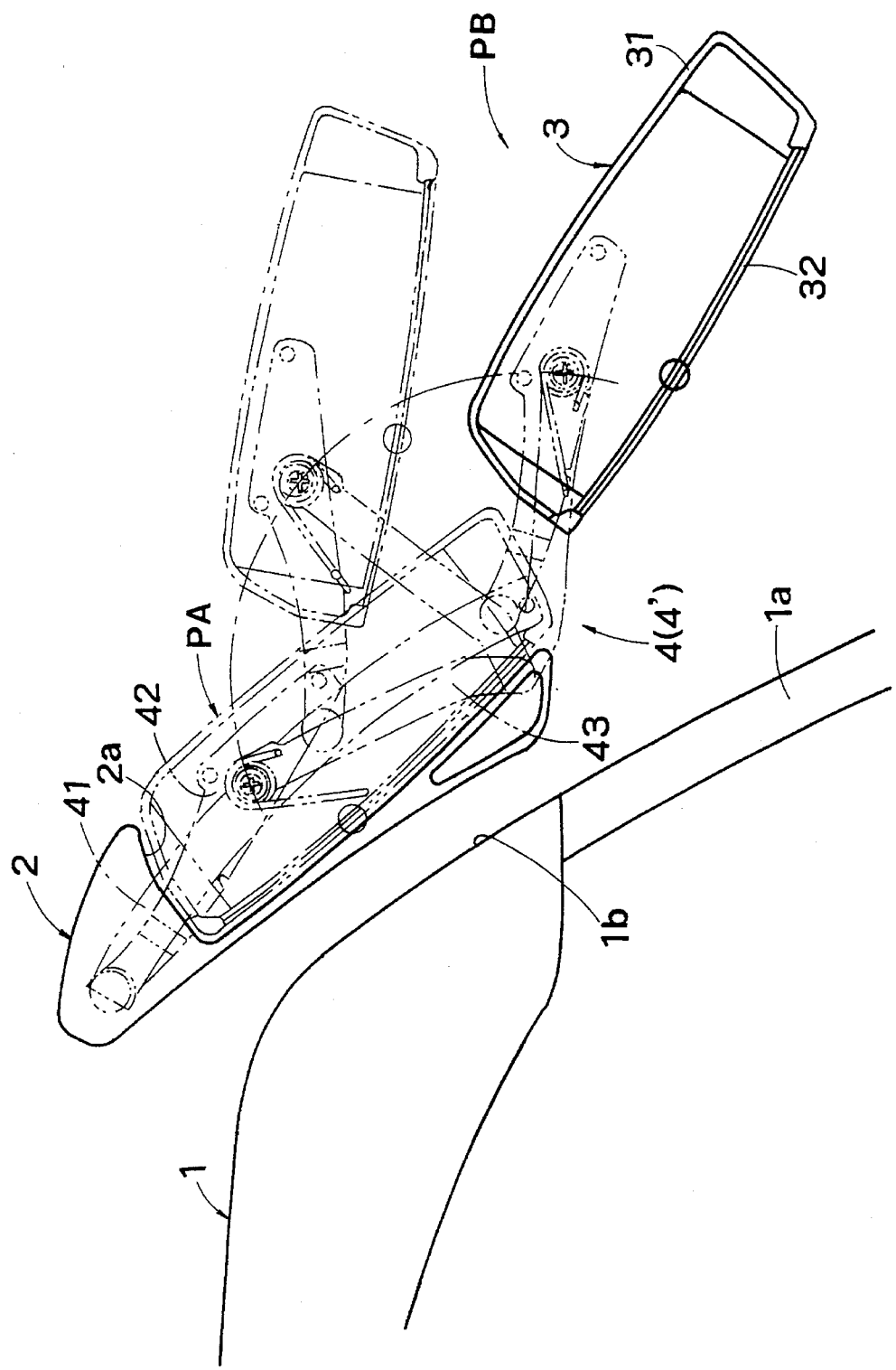
FIG. 1 is a side view of a retractable rear under view mirror system illustrating an operation thereof according to the present invention.
Figure 2:
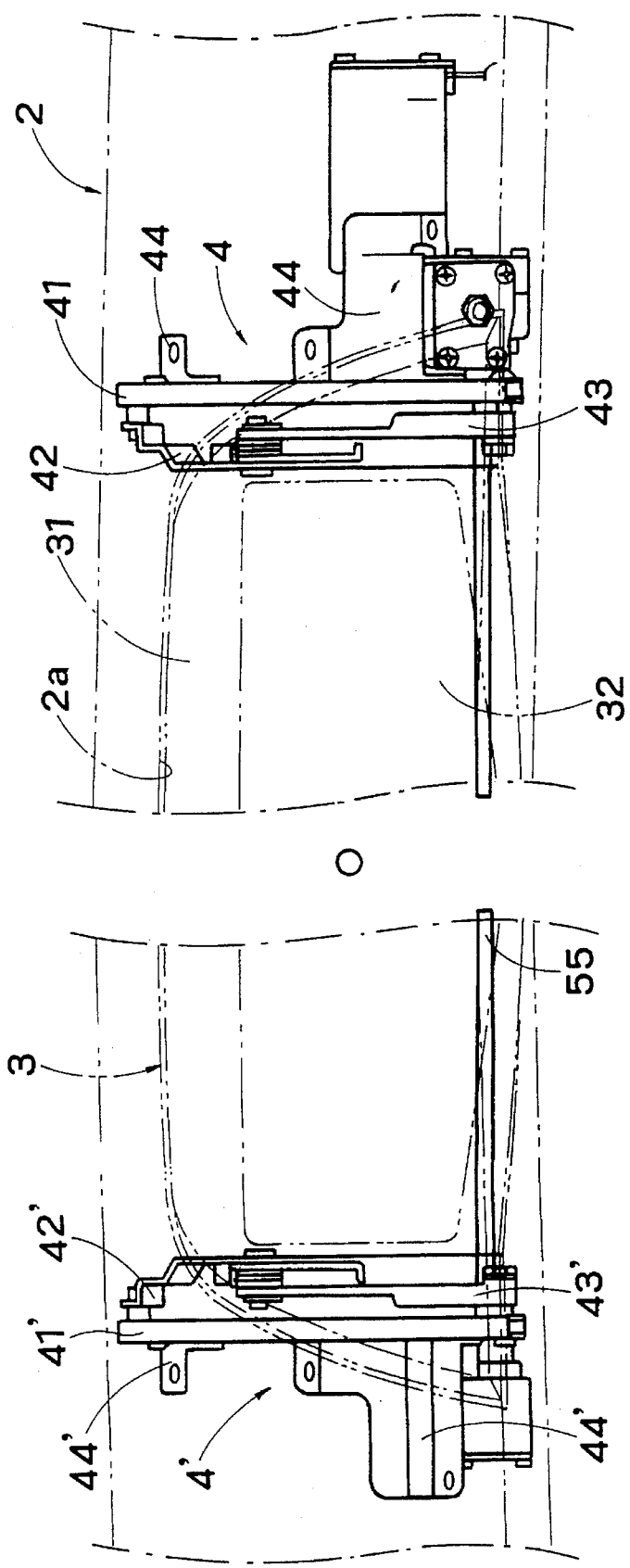
FIG. 2 is a front view of a retractable rear under view mirror system of an embodiment of the present invention.
Figure 3:
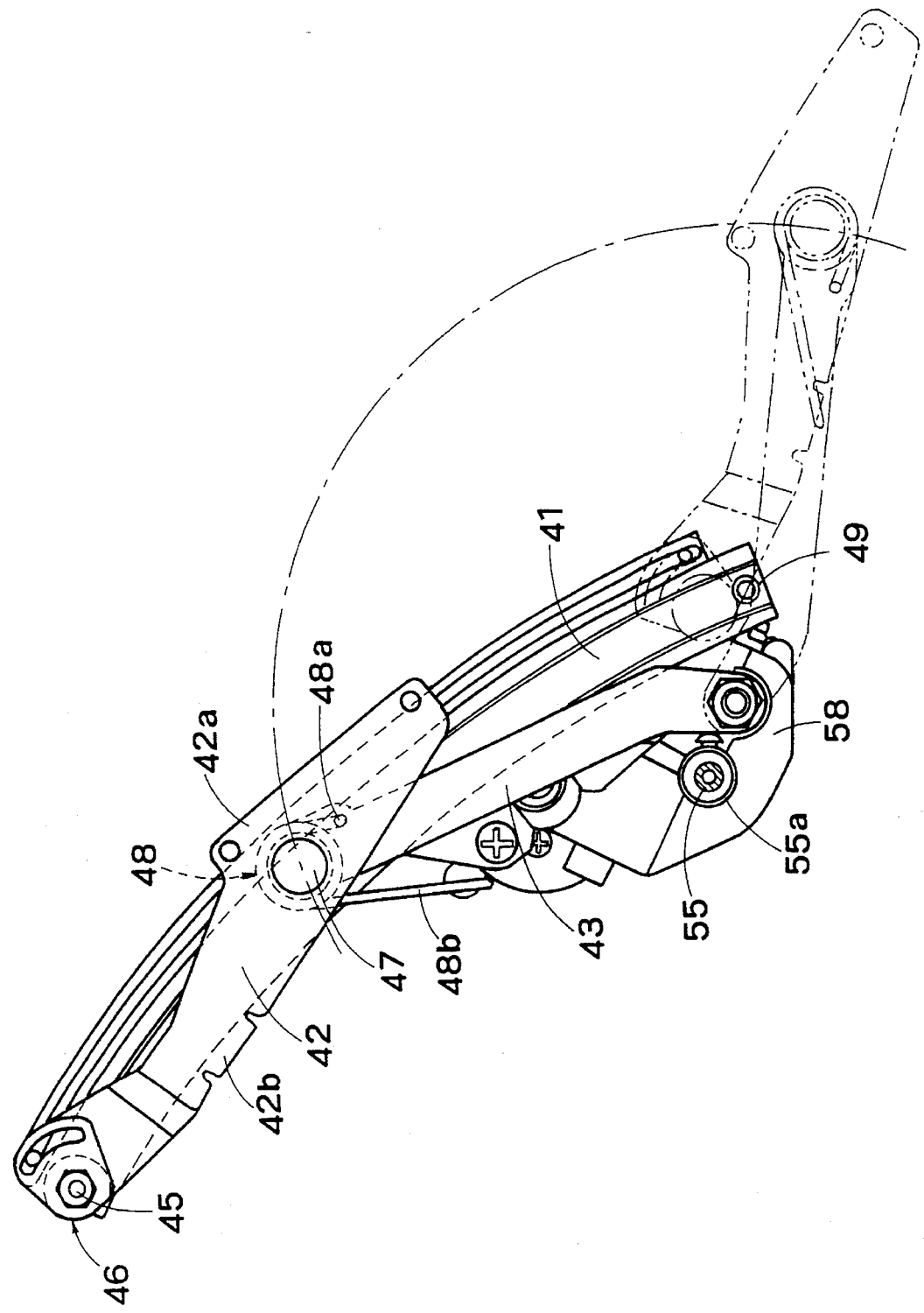
FIG. 3 is a side view of a supporting mechanism of the retractable rear under view mirror system according to the above embodiment.

As shown in FIGS. 1 and 2, a hollow deflector 2 is fixed to an upper portion of a rear door 1b which is disposed rearward of a vehicle 1 and provided with a window pane 1a. The deflector 2 is provided in spaced relationship with the rear door 1b for guiding an air flow which is produced when the vehicle 1 is running, to reduce the air resistance caused by the air flow and applied to the vehicle 1, or provided for blowing the air to the window pane 1a to sweep the window pane 1a, i.e., to blow off rain drops or the like. On this deflector 2 is mounted a movable member 3 which is movably supported by a supporting mechanism 4 described later. The movable member 3 is selectively positionable from a stored position PA, where it is retracted into a recess 2a formed on the reflector 2, to a use position PB, where it is extended out of the deflector 2, in response to movement of the supporting mechanism 4.

As shown in FIGS. 1 and 2, the movable member 3 includes a main body 31 which forms a part of the outer surface of the deflector 2 in the stored position PA, and a mirror 32 which is concealed by the deflector 2 and the main body 31 in the stored position PA and which reflects the rear under view of the vehicle 1 in the use position PB. The supporting mechanisms 4, 4' are provided at the opposite sides of the movable member 3, and include guide rails 41, 41' which are fixed to the deflector 2, first links 42, 42' which are slidably supported by the guide rails 41, 41' and fixed to the movable member 3, and second links 43, 43' which are supported by the first links 42, 42' and operatively connected with a driving mechanism 5 which will be described later. The supporting mechanism 4' is substantially the same as the supporting mechanism 4, so that the explanation will be made mostly about the latter for the purpose of simplicity.

As shown in FIGS. 2–6, the guide rail 41 extends from the top to the bottom (upward in FIG. 1) of the deflector 2, and forms an arc configuration longitudinally, with a substantially C-shaped cross section. This guide rail 41 is secured by screws (not shown) within the deflector 2 through a bracket 44. On one end portion of the first link 42 is mounted a pin 45 which extends within the cross sectional configuration of the guide rail 41, and around which a roller 46 is rotatably mounted. The roller 46 is also slidably mounted on the guide rail 41. On the other end portion of the first link 42, is formed a bracket portion 42a which is secured to the main body 31 of the movable member 3. On the guide rail 41, a stopping member 49 is fixed to be engageable with the roller 46. When the roller 46 is engaged with the stopping member 49, the sliding movement of the first link 42 along the guide rail 41 will be restricted. One end of the second link 43 is rotatably mounted on the first link 42 by a pin 47. A spring 48 is disposed around the pin 47, such that its one end 48a is engageable with an engaging hole formed in the second link 43 and its opposite end 48b is engageable with a flange portion 42b formed on the first link 42.

Figure 4:
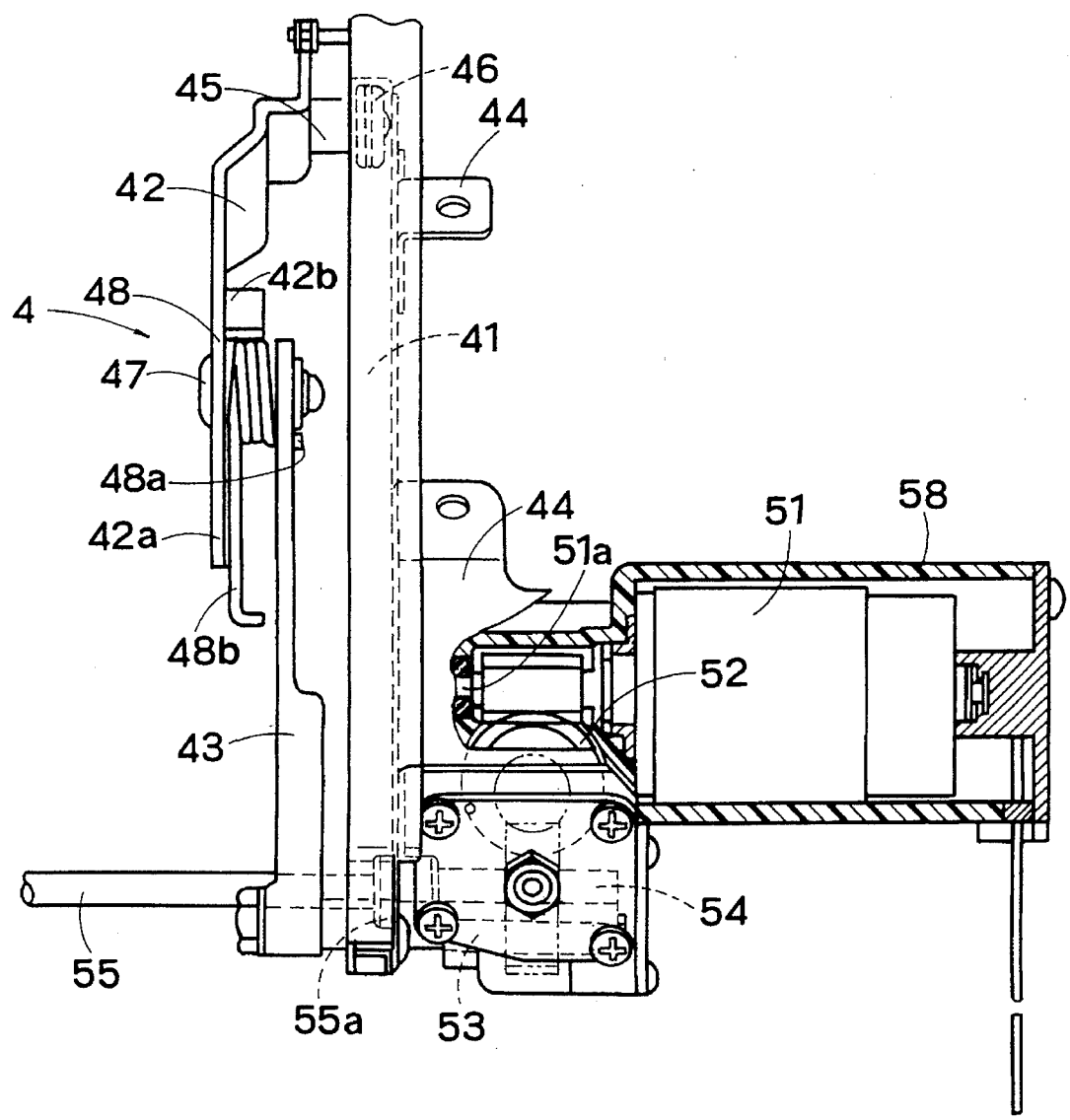
FIG. 4 is a partially sectioned front view of the retractable rear under view mirror system according to the above embodiment.
Figure 5:
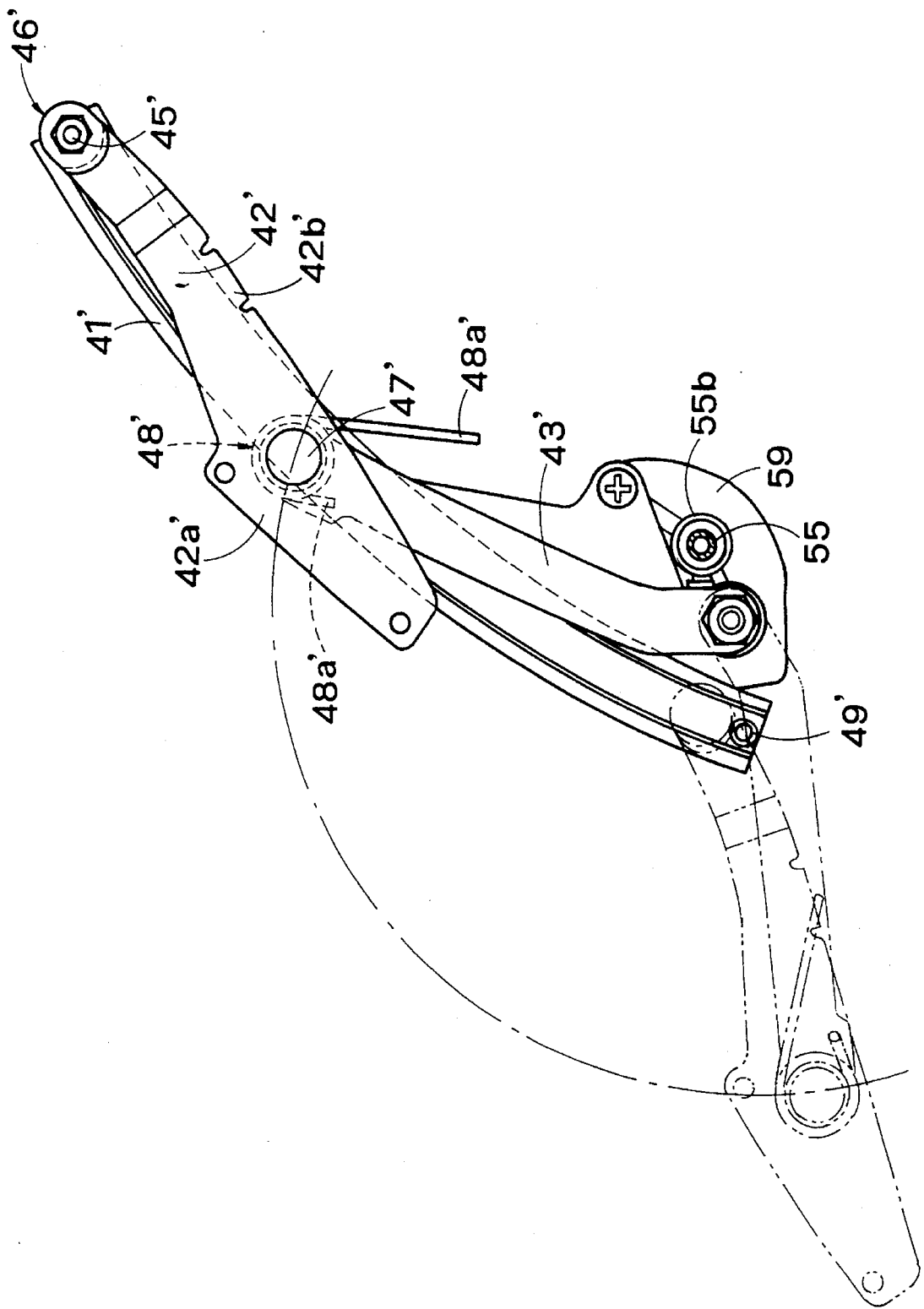
FIG. 5 is a side view of another supporting mechanism of the retractable rear under view mirror system according to the above embodiment.
Figure 6:
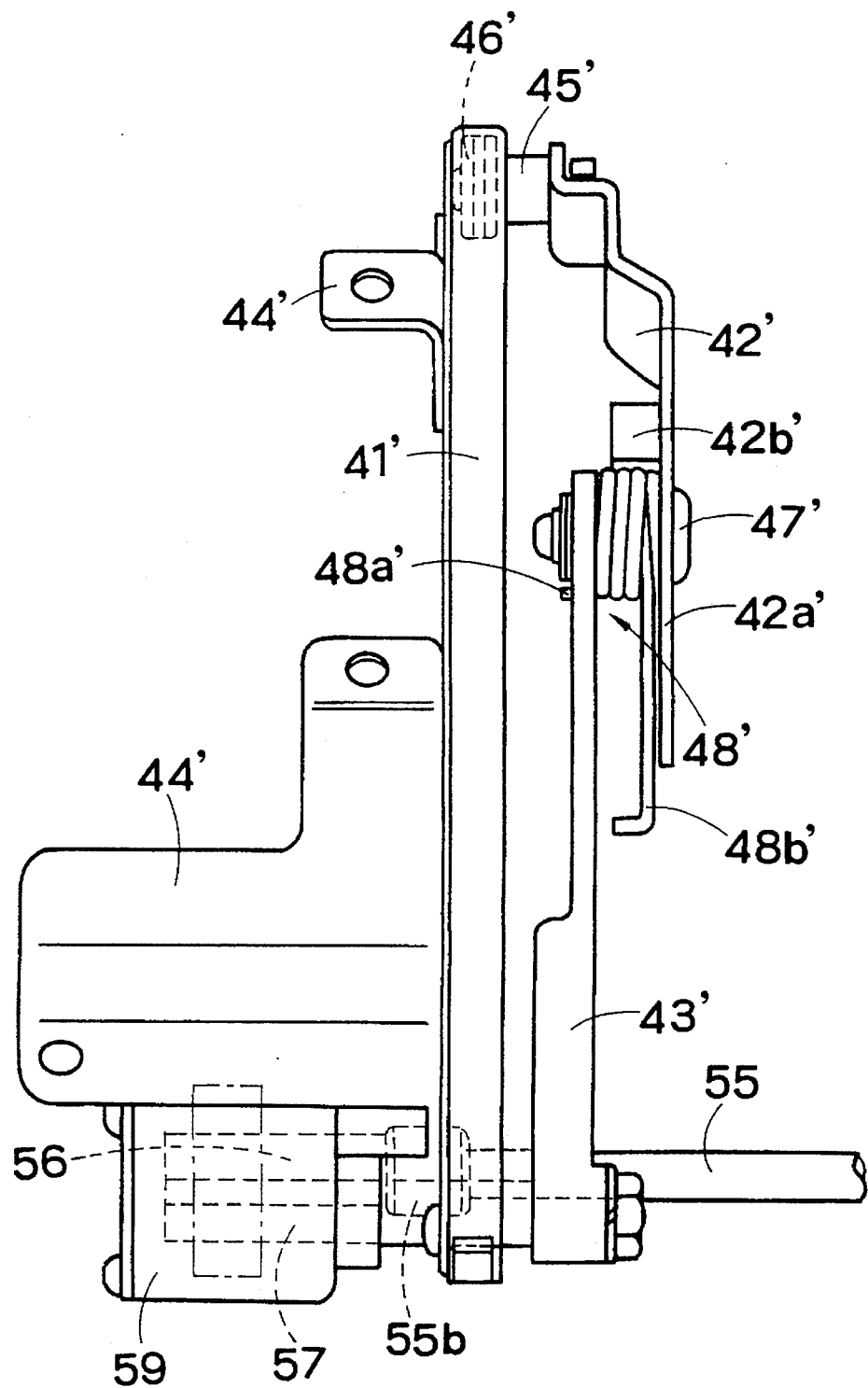
FIG. 6 is a front view of another supporting mechanism of the retractable rear under view mirror system according to the above embodiment.

The driving mechanism 5 has a motor 51 as shown in FIG. 4. An output shaft 51a of the motor 51 is linked with a first output shaft 53 and a second output shaft 54 through a known gear mechanism 52 which includes a plurality of gears for providing a decelerating function. The first output shaft 53 is linked with the other end portion of the second link 43 of the supporting mechanism 4. The second output shaft 54 is linked with the other end portion of the second link 43' of the supporting mechanism 4', through a connecting shaft 55 which is secured to the second output shaft 54 by a collar 55a, an input shaft 56 which is secured to the connecting shaft 55 by a collar 55b, and a third output shaft 57 meshed with the input shaft 56. The motor 51, gear mechanism 52, first output shaft 53 and second output shaft 54 are received and supported within a case 58 which is secured to the bracket 44, and located within the deflector 2 at the side of the supporting mechanism 4. The input shaft 56 and third output shaft 57 are received and supported within a case 59 which is secured to the bracket 44', and located within the deflector 2 at the side of the supporting mechanism 4'. The connecting shaft 55 is located within the deflector 2 longitudinally along the movable member 3.

In the stored position PA where the movable member 3 is retracted within the deflector 2 as shown in FIG. 1, when the motor 51 is rotated in the normal direction, the first output shaft 53 and second output shaft 54 are rotated through the gear mechanism 52. The rotation of the first output shaft 53 is transmitted to the supporting mechanism 4, and the rotation of the second output shaft 54 is transmitted to the supporting mechanism 4', through the connecting shaft 55, input shaft 56 and third output shaft 57, so that the supporting mechanisms 4 and 4' will move together. When the supporting mechanisms 4, 4' are actuated to move, the second links 43, 43' rotate clockwise in FIG. 1 in response to rotation of the first output shaft 53 and third output shaft 57. Then, the first links 42, 42' are elevated counter-clockwise in FIG. 1, sliding downward in FIG. 1 along the guide rails 41, 41', whereby the movable member 3 extends along a short locus adjacent to the deflector 2, with its angle controlled, to be extended out of the deflector 2 and held in the use position PB as shown in FIG. 1. Consequently, the rear under field of the vehicle 1 is reflected by the mirror 32 of the movable member 3 to ensure the rear under view from a driver's seat of the vehicle 1. Therefore, it is useful for the driver to observe the rearward field of view when he drives the vehicle 1 backward. In this respect, the first links 42, 42' engage with the end portion 48b of the spring 48 to deform the spring 48, and rotate clockwise in FIG. 1, sliding downward in FIG. 1.

In the use position PB where the movable member 3 is exteded out of the deflector 2, when the motor 51 is rotated in the reverse direction, the supporting mechanisms 4, 4' move in the same manner as described above, and the second links 43, 43' rotate counter-clockwise in FIG. 1 in response to rotation of the first output shaft 53 and third output shaft 57. Then, the first links 42, 42' are elevated clockwise in FIG. 1, sliding upward in FIG. 1 along the guide rails 41, 41'. Consequently, the movable member 3 extends along the short locus adjacent to the deflector 2, with its angle controlled, to be retracted within the deflector 2 and held at the stored position PA as shown in FIG. 1. In this case, the first links 42, 42' have been applied with biasing force by the deformed spring 48, whereby the first links 42, 42' rotate counter-clockwise in FIG. 1, sliding upward in FIG. 1. In the above-described embodiment, the deflector 2 serves as a base member, the movable member 3 serves as a mirror assembly, and the supporting mechanism 4(4') and driving mechanism 5 serve as actuating means or an actuator.

Next, referring to FIG. 7, a controller, or control circuit 6 will be explained. It includes a central processing unit (CPU) 61, an input circuit 62, a power circuit 63, a driving circuit 64 and a current sensing circuit 65. The CPU 61 has input ports P1–P5, the input ports P1, P2 and P3 of which are electrically connected to a reverse switch 66, a manual switch 67 and a rear door switch 68 which serves as detection means for detecting a state of the rear door 1b, respectively, through an input circuit 62. The reverse switch 66 is provided in a known transmission (not shown) of the vehicle 1, and arranged to be turned on when the transmission is selected to be positioned in the reverse position, where the vehicle 1 is driven backward, and turned off in other positions. The manual switch 67 is provided on an instrument panel (not shown) installed in the vehicle 1 for controlling the motor 51 to rotate in the normal direction or reverse direction. The manual switch 67 is of the type of a momentary (non-lock) switch which is turned on as long as a pressing force is applied thereto, and turned off when the pressing force is released. The rear door switch 68 is arranged to be turned on or off in accordance with the open state or closed state of the rear door 1b, respectively, and serves as one of the door switches (so called courtesy switches) which is turned on when one of the doors of the vehicle 1 is opened, to lighten a room lamp (not shown), a courtesy lamp (not shown) provided for each door and a warning lamp for indicating the opened door (not shown). That is, the rear door switch 68 is turned on when the rear door 1b is open, whereas it is turned off when the rear door 1b is closed.

A motor 51 is electrically connected to the input port P4 of the CPU 61 through the input circuit 62, a signal for representing a position of the movable member 3, i.e., a retracted position, an operating position or a transitional position, is fed to the input port P4 through the input circuit 62. The input port P5 is electrically connected to the current sensing circuit 65 which is connected to the motor 51, and which determines whether an overcurrent (e.g., more than 6 ampere) has been fed or not, and outputs a resultant signal to the input port P5. The output port P6 of the CPU 61 is electrically connected to the driving circuit 64 which is connected to the motor 51. The power circuit 63 is electrically connected to a battery 69 which is installed in the vehicle 1, and connected to the CPU 61, input circuit 62, driving circuit 64 and current sensing circuit 65 to supply an electric power to each circuit.

Figure 8:
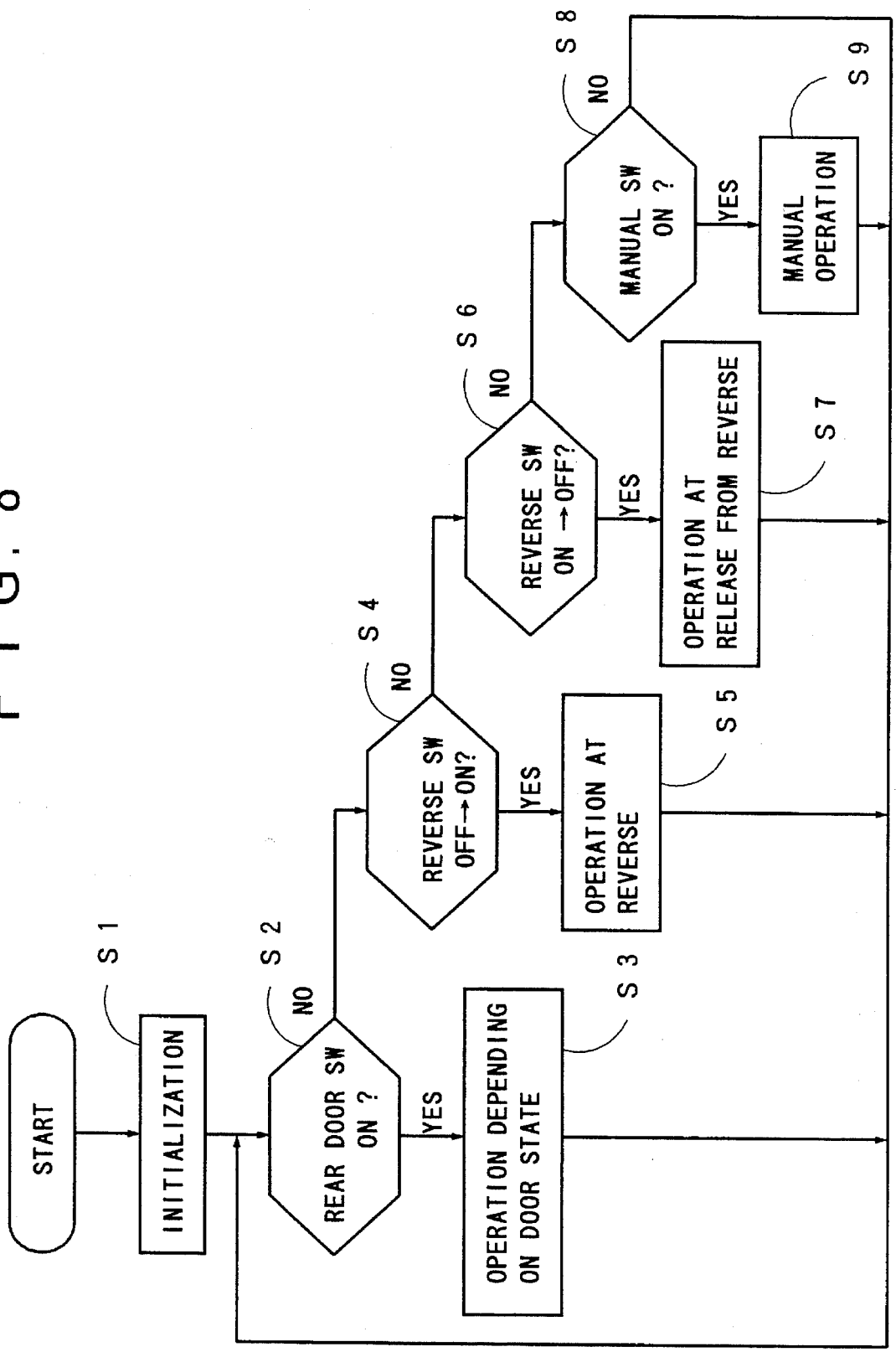
FIG. 8 is a flow chart showing a general operation of the controller in the above embodiment.

The above-described control circuit 6 operates in accordance with a program corresponding to the flow chart of FIG. 8, which will be explained hereinafter. At Step S1, an initialization of the CPU 61 is executed to position the movable member 3 in its stored position PA and stop the motor 51. Then, the program proceeds to Step S2 where the state of the rear door 61 is determined by the rear door switch 68, i.e., it is determined whether the rear door switch 68 is ON or OFF. If it is determined that the rear door switch 68 is ON, the program proceeds to Step S3 where an "operation depending on door state" is executed as described later, and thereafter returns to Step S2. In the case where the rear door switch 68 is OFF with the rear door 1b closed, then the program proceeds to Step S4 where it is determined whether the reverse switch 66 has been switched from OFF to ON. If it is determined at Step S4 that the reverse switch 66 has been switched from OFF to ON, the program proceeds to Step S5 where an "operation at reverse" is executed as described later, and thereafter returns to Step S2. In the case where the reverse switch 66 has not been switched from OFF to ON, the program proceeds to Step S6 where it is determined whether the reverse switch 66 has been switched from ON to OFF. If it is determined at Step S6 that the reverse switch 66 has been switched from ON to OFF, the program proceeds to Step S7 where an "operation at release from reverse" is executed as described later, and thereafter returns to Step S2. At Step S6, if it is determined that the reverse switch 66 has not been switched from ON to OFF, the program proceeds to Step S8 where it is determined whether the manual switch 67 has been pressed (i.e., ON) or not (i.e., OFF). If the manual switch 67 is ON, the program proceeds to Step S9 where a "manual operation" is executed as described later, and thereafter returns to Step S2. If it is determined at Step S8 that the manual switch 67 is OFF, then the program returns to Step S2.

Figure 9:
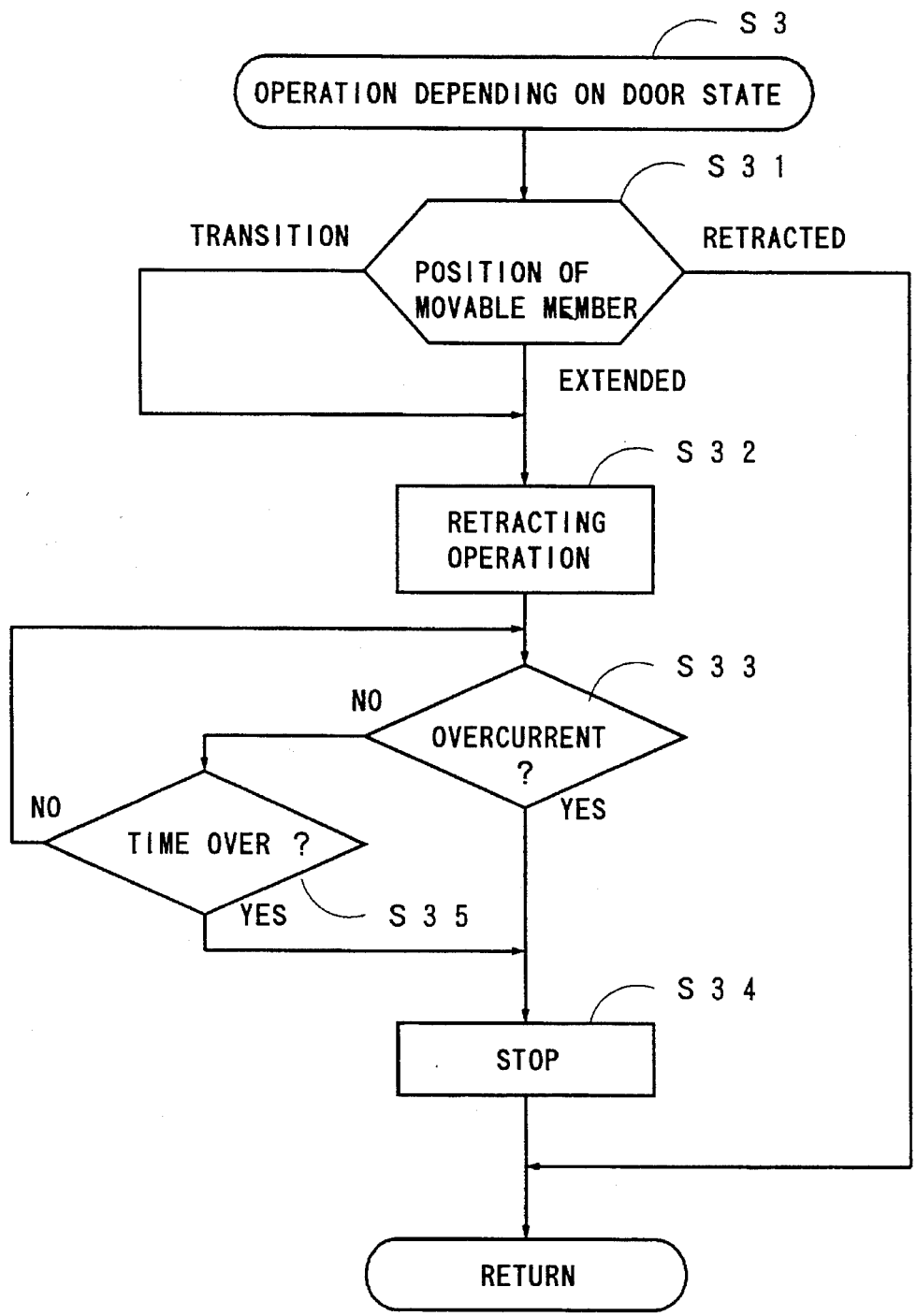
FIG. 9 is a flow chart showing an operation which is executed when a state of a rear door is detected, according to the above embodiment.

Referring to FIG. 9, the "operation depending on door state" executed at Step S3 will be explained hereinafter. When it is determined at Step S2 in FIG. 8 that the rear door 1b is open so that the rear door switch 68 is turned OFF, the program proceeds to Step S31 in FIG. 9 where it is determined which position the movable member 3 is positioned in, out of its stored position (i.e., retracted position), its use position (i.e., extended position) and its transitional position.

If it is determined at Step S31 that the movable member 3 is retracted (positioned in its stored position), a signal representing this position is fed to the input port P4 of the CPU 61 through the input circuit 62, and in response to that signal, a signal for stopping the rotation of the motor 51 or maintaining the stopped state of the motor 51 is fed from the output port P6 to the driving circuit 64, so as to hold the motor 51 in its stopped state. Consequently, the movable member 3 is held to be in its stored position PA (then, the program returns to Step S2). If it is determined at Step S31 that the movable member 3 is not in its stored position, i.e., the movable member 3 is in its use position or transitional position, a signal representing this position is fed to the input port P4 of the CPU 61 through the input circuit 62, and then a signal for rotating the motor 51 in the reverse direction is fed from the output port P6 to the driving circuit 64. Then, the program proceeds to Step S32 where the motor 51 is rotated in the reverse direction, in response to the signal fed from the output port P6 to initiate the retracting operation of the movable member 3.

Figure 7:
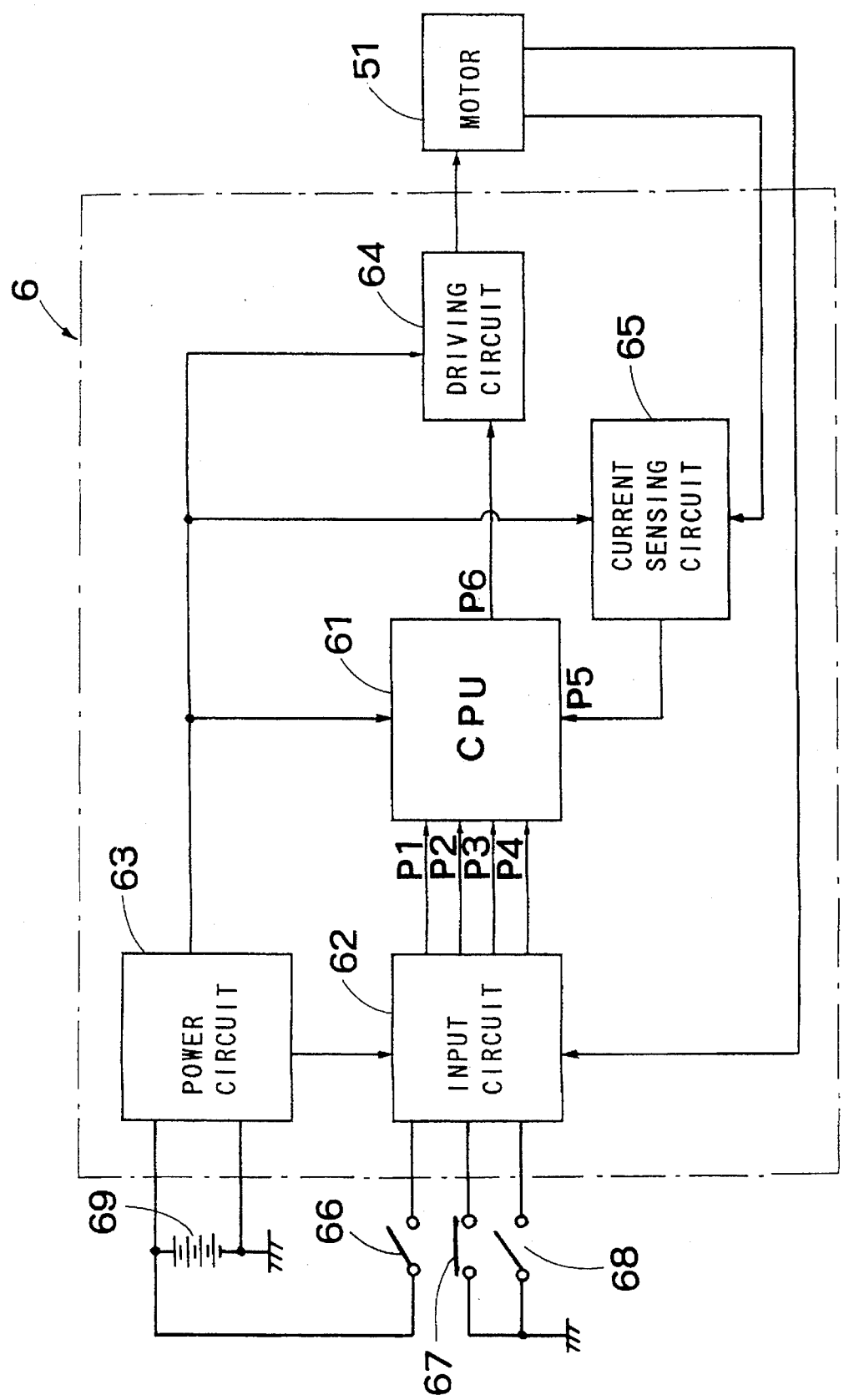
FIG. 7 is a block diagram showing a controller of the above embodiment.

In a current sensing circuit 65 illustrated in FIG. 7, it is determined whether an electric current fed to the motor 51 is overcurrent or not, i.e., whether the current fed to the motor 51 exceeds a predetermined value or not. If it is determined at Step S33 that the current fed to the motor 51 is overcurrent, a signal representing this is fed to the input port P5 of the CPU 61, to output a signal for stopping the motor 51 (a signal for stopping the current supply) in response to the input signal. At Step S34, the motor 51 is stopped by the driving circuit 64 in response to the output signal from the output port P6, so that the movable member 3 is positioned in its stored position, and the program returns to Step S2. On the contrary, if it is determined that the current fed to the motor 51 is not overcurrent, the signal representing this is fed to the input port P5 of the CPU 61, then in response to that signal, the output signal for feeding the current to the motor 51 is output from the output port P6, so that the motor 51 is continued to be fed with the current in response to this output signal. Then, the program proceeds to Step S35 where it is determined by a timer system in the CPU 61 whether the current has been fed to the motor 51 for a predetermined time. When the current has been fed to the motor 51 for the predetermined time, a signal representing this is output from the output port P6. Then, at Step S34, the motor 51 is stopped to position the movable member 3 in its stored position. If it is determined at Step S35 that the current has not been fed to the motor 51 for the predetermined time, the output signal is fed from the output port P6 by the timer system in the CPU 61, and it is determined at Step S33 whether the current fed to the motor 51 is overcurrent or not, and thereafter the above-described operation will be repeated.

Figure 10:
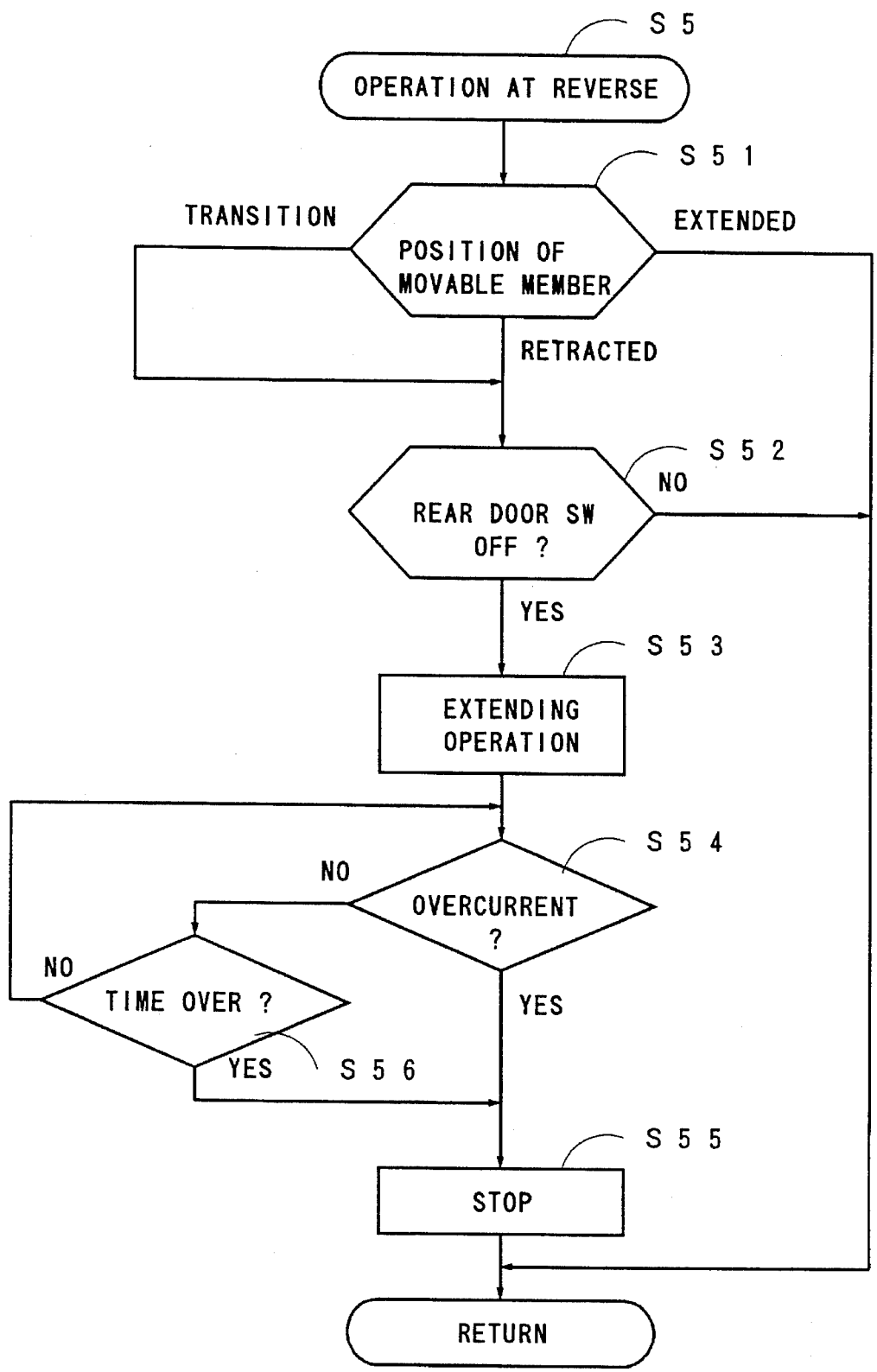
FIG. 10 is a flow chart showing an operation which is executed when a shift change to a reverse position has been made, according to the above embodiment.

Referring to FIG. 10, the "operation at reverse" executed at Step S5 will be described hereinafter. When it is determined at Step S4 in FIG. 8 that the reverse switch 66 is switched from OFF to ON, the program proceeds to Step S51 in FIG. 10 where it is determined which position the movable member 3 is positioned in, out of its stored position (i.e., retracted position), its use position (i.e., extended position) and its transitional position. If it is determined at Step S51 that the movable member 3 is extended (positioned in its use position), a signal representing this position is fed to the input port P4 of the CPU 61 through the input circuit 62, and in response to that signal, a signal for maintaining the stopped state of the motor 51 is fed from the output port P6 to the driving circuit 64, so as to hold the motor 51 in its stopped state. Consequently, the movable member 3 is held to be in its use position PB (then, the program returns to Step S2). If it is determined at Step S51 that the movable member 3 is not in its use position, i.e., the movable member 3 is in its stored position or transitional position, a signal representing this position is fed to the input port P4 of the CPU 61 through the input circuit 62, and then a signal for rotating the motor 51 in the normal direction is fed from the output port P6 to the driving circuit 64. Then, the program proceeds to Step S52 where the state of the rear door 1b is determined by the rear door switch 68. If it is determined at Step S52 that the rear door switch 68 is ON, i.e., the rear door 1b is open, the program returns to Step S2. If it is determined at Step S52 that the rear door switch 68 is OFF, i.e., the rear door 1b is closed, a signal representing this position is fed to the input port P3 of the CPU61 through the input circuit 62, and in response to this signal, a signal for rotating the motor 51 in the normal direction is output from the output port P6. Then, at Step S53, the motor 51 is rotated in the normal direction, in response to the signal fed from the output port P6 to initiate the extending operation of the movable member 3.

At Step S54, it is determined by the current sensing circuit 65 whether the electric current fed to the motor 51 is overcurrent or not, i.e., whether the current fed to the motor 51 exceeds a predetermined value or not. If the current fed to the motor 51 is overcurrent, the signal representing this is fed to the input port P5 of the CPU 61, to output the signal for stopping the motor 51 (the signal for stopping the current supply) in response to the input signal. Then, at Step S55, the motor 51 is stopped by the driving circuit 64 in response to the output signal from the output port P6, so that the movable member 3 is positioned in its stored position, and the program returns to Step S2. On the contrary, if it is determined that the current fed to the motor 51 is not overcurrent, the signal representing this is fed to the input port P5 of the CPU 61, then in response to that signal, the output signal for feeding the current to the motor 51 is output from the output port P6, so that the motor 51 is continued to be fed with the current in response to this output signal. Then, the program proceeds to Step S56 where it is determined by the timer system in the CPU 61 whether the current has been fed to the motor 51 for the predetermined time. When the current has been fed to the motor 51 for the predetermined time, the signal representing this is output from the output port P6. Then, at Step S55 the motor 51 is stopped to position the movable member 3 in its stored position. If it is determined at Step S56 that the current has not been fed to the motor 51 for the predetermined time, the output signal is fed from the output port P6 by the timer system in the CPU 61, and it is determined at Step S54 whether the current fed to the motor 51 is overcurrent or not, and thereafter the above-described operation will be repeated.

Figure 11:
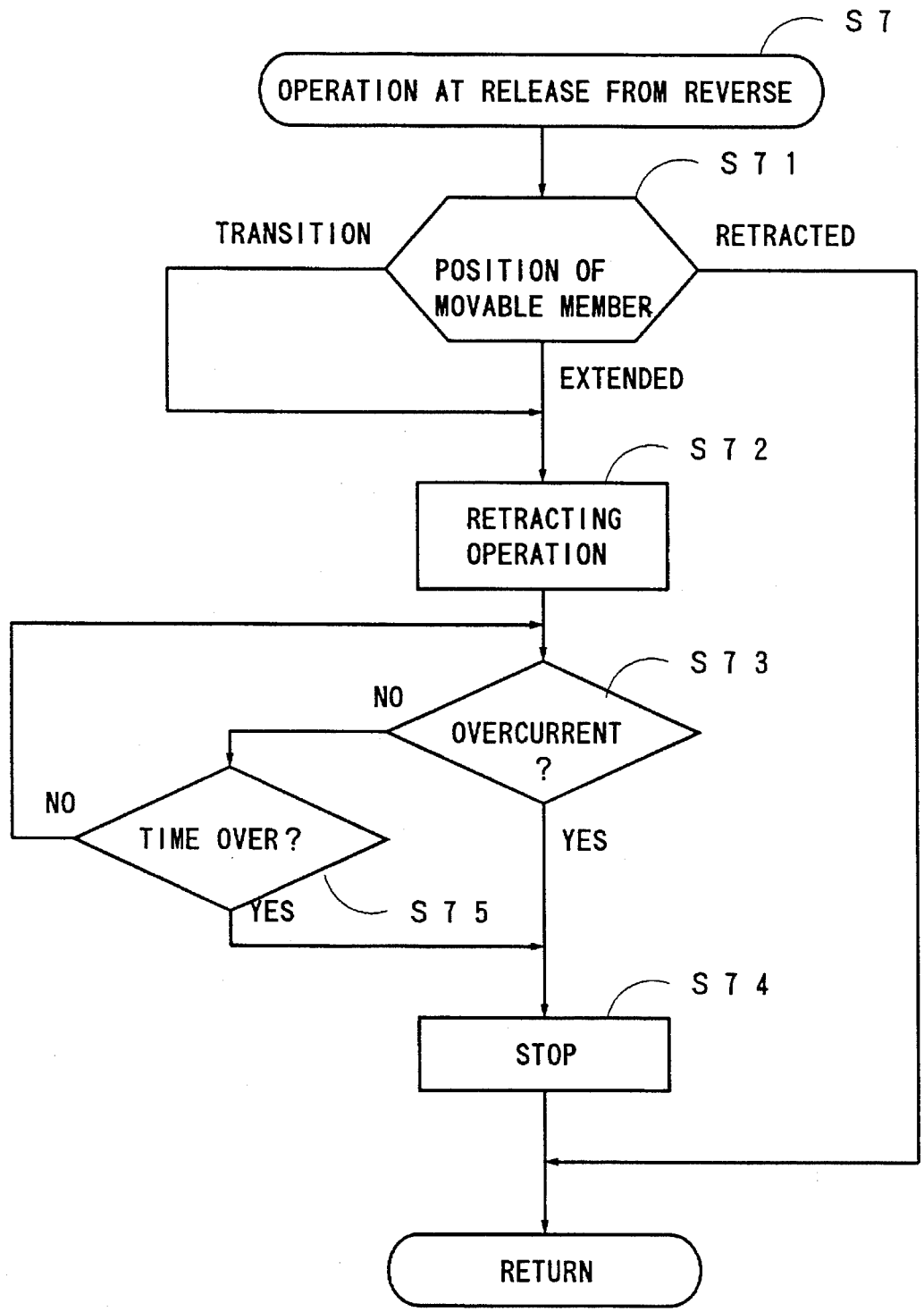
FIG. 11 is a flow chart showing an operation which is executed when the reverse position has been released, according to the above embodiment.

Next, referring to FIG. 11, the "operation at release from reverse" executed at Step S7 in FIG. 8 will be described hereinafter. When it is determined at Step S6 in FIG. 8 that the reverse switch 68 has been switched from ON to OFF, the program proceeds to Step S71 in FIG. 11 where it is determined which position the movable member 3 is positioned in, out of its retracted position, its extended position and its transitional position. If it is determined at Step S71 that the movable member 3 is positioned in its retracted position, the program returns to Step S2. If it is determined at Step S71 that the movable member 3 is not in the retracted position, i.e., the movable member 3 is in its extended position or transitional position, the signal representing this position is fed to the input port P4 of the CPU 61 through the input circuit 62, and then the signal for rotating the motor 51 in the reverse direction is fed from the output port P6 to the driving circuit 64. Then, the program proceeds to Step S72 where the motor 51 is rotated in the reverse direction, in response to the signal fed from the output port P6 to initiate the retracting operation of the movable member 3.

At Step S73, it is determined by the current sensing circuit 65 whether the electric current fed to the motor 51 is overcurrent or not, i.e., whether the current fed to the motor 51 exceeds a predetermined value or not. If the current fed to the motor 51 is overcurrent, the signal representing this is fed to the input port P5 of the CPU 61, to output the signal for stopping the motor 51 (the signal for stopping the current supply) in response to the input signal. Then, at Step S74, the motor 51 is stopped by the driving circuit 64 in response to the output signal from the output port P6, so that the movable member 3 is positioned in its stored position, and the program returns to Step S2. On the contrary, if it is determined that the current fed to the motor 51 is not overcurrent, the signal representing this is fed to the input port P5 of the CPU 61, then in response to that signal, the output signal for feeding the current to the motor 51 is output from the output port P6, so that the motor 51 is continued to be fed with the current in response to this output signal. Then, the program proceeds to Step S75 where it is determined by the timer system in the CPU 61 whether the current has been fed to the motor 51 for the predetermined time. When the current has been fed to the motor 51 for the predetermined time, the signal representing this is output from the output port P6. Then, at Step S74, the motor 51 is stopped to position the movable member 3 in its stored position. If it is determined at Step S75 that the current has not been fed to the motor 51 for the predetermined time, the output signal is fed from the output port P6 by the timer system in the CPU 61, and it is determined at Step S73 whether the current fed to the motor 51 is overcurrent or not, and thereafter the above-described operation will be repeated.

Referring to FIG. 12, the "manual operation" executed at Step S8 will be described hereinafter. When it is determined at Step S8 in FIG. 8 that the manual switch 67 is ON, the program proceeds to Step S90 in FIG. 9 where it is determined which position the movable member 3 is positioned in, out of its retracted position, its extended position and its transition position. If it is determined at Step S90 that the movable member 3 is in its extended position or transitional position, the signal representing this position is fed to the input port P4 of the CPU 61 through the input circuit 62, and then the signal for rotating the motor 51 in the reverse direction is fed from the output port P6 to the driving circuit 64. Then, the program proceeds to Step S92 where the motor 51 is rotated in the reverse direction, in response to the signal fed from the output port P6 to initiate the retracting operation of the movable member 3.

At Step S92, it is determined by the current sensing circuit 65 whether the electric current fed to the motor 51 is overcurrent or not, i.e., whether the current fed to the motor 51 exceeds a predetermined value or not. If the current fed to the motor 51 is overcurrent, the signal representing this is fed to the input port P5 of the CPU 61, to output the signal for stopping the motor 51 (the signal for stopping the current supply) in response to the input signal. Then, at Step S93, the motor 51 is stopped by the driving circuit 64 in response to the output signal from the output port P6, so that the movable member 3 is positioned in its stored position, and the program returns to Step S2. On the contrary, if it is determined that the current fed to the motor 51 is not overcurrent, the signal representing this is fed to the input port P5 of the CPU 61, then in response to that signal, the output signal for feeding the current to the motor 51 is output from the output port P6, so that the motor 51 is continued to be fed with the current in response to this output signal. Then, the program proceeds to Step S94 where it is determined by the timer system in the CPU 61 whether the current has been fed to the motor 51 for the predetermined time. When the current has been fed to the motor 51 for the predetermined time, the signal representing this is output from the output port P6. Then, at Step S93, the motor 51 is stopped to position the movable member 3 in its stored position. If it is determined at Step S94 that the current has not been fed to the motor 51 for the predetermined time, the output signal is fed from the output port P6 by the timer system in the CPU 61, and it is determined at Step S92 whether the current fed to the motor 51 is overcurrent or not, and thereafter the above-described operation is repeated. Then, the motor 51 is stopped to position the movable member 3 in its stored position PA.

If it is determined at Step 90 that the movable member 3 is in its stored position, a signal representing this position is fed to the input port P4 of the CPU 61 through the input circuit 62, and in response to this signal, a signal for rotating the motor 51 in the normal direction is fed from the output port P6 to the driving circuit 64. Then, the program proceeds to Step S95 where the state of the rear door 1b is determined by the rear door switch 68. If it is determined that the rear door switch 68 is ON, i.e., the rear door 1b is open, the program returns to Step S2. If it is determined at Step S95 that the rear door switch 68 is OFF, i.e., the rear door 1b is closed, a signal representing this position is fed to the input port P3 of the CPU61 through the input circuit 62, and in response to this signal, a signal for rotating the motor 51 in the normal direction is output from the output port P6. Then, at Step S96, the motor 51 is rotated in the normal direction in response to the signal fed from the output port P6 to initiate the extending operation of the movable member 3.

At Step S97, it is determined by the current sensing circuit 65 whether the electric current fed to the motor 51 is overcurrent or not, i.e., whether the current fed to the motor 51 exceeds a predetermined value or not. If the current fed to the motor 51 is overcurrent, the signal representing this is fed to the input port P5 of the CPU 61, to output the signal for stopping the motor 51 (the signal for stopping the current supply) in response to the input signal. Then, at Step S98, the motor 51 is stopped by the driving circuit 64 in response to the output signal from the output port P6, so that the movable member 3 is positioned in its stored position, and the program returns to Step S2. On the contrary, if it is determined that the current fed to the motor 51 is not overcurrent, the signal representing this is fed to the input port P5 of the CPU 61, then in response to that signal, the output signal for feeding the current to the motor 51 is output from the output port P6, so that the motor 51 is continued to be fed with the current in response to this output signal. Then, the program proceeds to Step S99 where it is determined by the timer system in the CPU 61 whether the current has been fed to the motor 51 for the predetermined time. When the current has been fed to the motor 51 for the predetermined time, the signal representing this is output from the output port P6. Then, at Step S98 the motor 51 is stopped to position the movable member 3 in its stored position. If it is determined at Step S99 that the current has not been fed to the motor 51 for the predetermined time, the output signal is fed from the output port P6 by the timer system in the CPU 61, and it is determined at Step S97 whether the current fed to the motor 51 is overcurrent or not, and thereafter the above-described operation is repeated. Then, the motor 51 is stopped to position the movable member 3 in its stored position PA and the program returns to Step S2.

According to the present embodiment as described above, the state of the rear door 1b is determined by the rear door switch 68 which is electrically connected with the room lamp or door warning lamp, and in response to the signal representing the state, if it is determined in the control circuit 6 that the rear door 1b has moved from its closed state to its open state, the movable member 3 is actuated so as to be positioned in its stored position PA. Thus, in the case where the rear door 1b is open, since the signal from the rear door switch 68 has a priority in the control circuit 6, the movable member 3 is held in its stored position PA. Consequently, the movable member 3 will hardly collide with any obstacle or the like over the rear portion of the vehicle 1, and therefore the movable member 3, supporting mechanisms 4, 4' and the driving mechanism 5 will not be damaged.

It should be apparent to one skilled in the art that the above-described embodiment is merely illustrative of but a few of the many possible specific embodiments of the present invention. Many modifications may be made by those skilled in the art without departing from the spirit and scope of the invention as defined in the following claims.

What is claimed is:

1. A retractable rear under view mirror system mounted on a rearward portion of an automotive vehicle in which a rear under field of view from a driver's seat is obscured and which has a rear door hingedly mounted on a body of the vehicle for being opened, comprising:

a base member positioned on a rearward portion of said automotive vehicle, said base member being a deflector mounted on the automotive vehicle in a spaced relationship with respect to the vehicle for deflecting air flow to the rear door of the automotive vehicle;

a mirror assembly movably supported by said base member and selectively positionable from a stored position inside said base member to a use position in which said mirror assembly reflects the rear under field of view of the automotive vehicle;

actuating means for actuating said mirror assembly to be positioned in said stored position or said use position;

detection means for detecting a state of said rear door which is positionable in an open state and a closed state; and control means for controlling said actuating means in response to an output of said detection means to move said mirror assembly to a position responsive to the state of said rear door detected by said detection means.

2. The retractable rear under view mirror system according to claim 1, wherein said deflector is mounted on said rear door at an upper portion thereof.

3. The retractable rear under view mirror system according to claim 2, wherein said control means includes determination means for determining a position of said mirror assembly relative to said base member, said control means controlling said actuating means in response to a result of said determination means and the output of said detection means.

4. The retractable rear under view mirror system according to claim 3, further comprising manually operable switch means positionable in an ON or OFF state for operating the mirror assembly, said control means controlling said actuating means in response to the result of said determination means, the output of said detection means, and the state of said manual switch means.

5. The retractable rear under view mirror system according to claim 3, further comprising shift change detection means for detecting a shift change of a transmission to a reverse position, said control means controlling said actuating means to cause movement of said mirror assembly to be positioned in said use position when said shift change detection means detects said shift change to said reverse position, and to cause movement of said mirror assembly to be positioned in said stored position when said shift change detection means detects said release from said reverse position.

6. The retractable rear under view mirror system according to claim 3, wherein said detection means includes a rear door switch which is turned on or off when said rear door is open, and which is turned off or on when said rear door is closed, respectively.

7. A retractable rear under view mirror system mounted on a rearward portion of an automotive vehicle in which a rear under field of view from a driver's seat is obscured and which has a hingedly mounted rear door mounted on a body of the vehicle, comprising:

a deflector mounted on an upper portion of said rear door and in spaced relationship with the rear door for deflecting air flow to said rear door, said deflector having a recess formed therein;

a mirror assembly movably supported by said deflector and selectively positionable between a retracted position in which said mirror assembly is disposed in said recess to an extended position in which said mirror assembly is disposed out of said recess;

actuating means for actuating said mirror assembly to be positioned in said retracted position or said extended position;

detection means for detecting said rear door being in an open state and a closed state;

output determination means for determining an output state of said detection means; and relative position determination means for determining a position of said mirror assembly relative to said deflector; and manually operable switch means positionable in an ON state or OFF state for operating the mirror assembly;

said control means controlling said actuating means in response to the determinations by said output determination means and said relative position determination means, the state detected by said detection means, and the state of said manual switch means.

8. The retractable rear under view mirror system according to claim 7, further comprising shift change detection means for detecting a shift change of a transmission of the vehicle to a reverse position and a release from said reverse position, said control means controlling said actuating means to cause movement of said mirror assembly to said extended position when said shift change detection means detects said shift change to said reverse position, and to cause movement of said mirror assembly to said retracted position when said shift change detection means detects said release from said reverse position.

9. A retractable rear under view mirror system mounted on a rearward portion of an automotive vehicle in which a rear under field of view from a driver's seat is obscured and which has a rear door hingedly mounted on a body of the vehicle for being opened, comprising:

a base member positioned on a rearward portion of said automotive vehicle;

a mirror assembly movably supported by said base member and selectively positionable from a stored position inside said base member to a use position in which said mirror assembly reflects the rear under field of view of the automotive vehicle;

actuating means for actuating said mirror assembly to be positioned in said stored position or said use position;

detection means for detecting a state of said rear door which is positionable in an open state and a closed state; and control means for controlling said actuating means in response to an output of said detection means and the position of the mirror assembly so that when said rear door is in an open state said mirror assembly is maintained in a stored position and when said rear door is moved from a closed state to the open state the mirror assembly in said use position is moved to said stored position.

* * * * *

UNITED STATES PATENT AND TRADEMARK OFFICE
CERTIFICATE OF CORRECTION

PATENT NO. : 5,497,273
DATED : March 5, 1996
INVENTOR(S) : Hidekazu KOGITA et al It is certified that error appears in the above-indentified patent and that said Letters Patent is hereby corrected as shown below:

Title page, item [54];

delete "RETRACTABEL" and insert -- RETRACTABLE --.

Signed and Sealed this

Fourteenth Day of May, 1996

*Attest:*

BRUCE LEHMAN

*Attesting Officer*     *Commissioner of Patents and Trademarks*